United States Patent
Hars (10) Patent No.: US 11,646,867 B2
(45) Date of Patent: May 9, 2023

(54) SYSTEMS AND METHODS IMPLEMENTING COUNTERMEASURES TO PHASE TRACKING ATTACKS ON RING OSCILLATOR BASED ENTROPY SOURCES

(71) Applicant: THE BOEING COMPANY, Chicago, IL (US)

(72) Inventor: Laszlo Hars, Lafayette, CO (US)

(73) Assignee: The Boeing Company, Arlington, VA (US)

(*) Notice: Subject to any disclaimer, the term of this patent is extended or adjusted under 35 U.S.C. 154(b) by 567 days.

(21) Appl. No.: 15/853,199

(22) Filed: Dec. 22, 2017

(65) Prior Publication Data

US 2019/0386820 A1    Dec. 19, 2019

(51) Int. Cl.
*H04L 9/06* (2006.01)
*H04L 9/08* (2006.01)
*G06F 7/58* (2006.01)

(52) U.S. Cl.
CPC .......... *H04L 9/0662* (2013.01); *H04L 9/0643* (2013.01); *H04L 9/0841* (2013.01); *G06F 7/582* (2013.01)

(58) Field of Classification Search
CPC ... H04L 9/0662; H04L 9/0841; H04L 9/0643; G06F 7/582; G06F 7/588
See application file for complete search history.

(56) References Cited

U.S. PATENT DOCUMENTS

| | | |
|---|---|---|
| 2005/0055391 A1 | 3/2005 | Carlson et al. |
| 2014/0004824 A1 | 1/2014 | Campagna et al. |
| 2014/0195576 A1* | 7/2014 | Kaplan .................. G06F 7/588 708/250 |
| 2016/0124716 A1 | 5/2016 | Venkata et al. |
| 2018/0062847 A1* | 3/2018 | Mildh .................... H04W 12/10 |
| 2018/0074791 A1* | 3/2018 | Atsumi ................... G06F 7/582 |

FOREIGN PATENT DOCUMENTS

EP    2 600 561 A1    6/2013

OTHER PUBLICATIONS

Merriam Webster Dictionary, definition of "permutation", pp. 1-9, captured on Feb. 18, 2020, obtained from https://www.merriam-webster.com/dictionary/permutation (Year: 2020).*
Extended European Search Report; dated Mar. 25, 2019; European Application No. 18212770.4-1218.
Office Action dated Feb. 17, 2021 in the corresponding European Patent Application No. 18212770.4.

* cited by examiner

*Primary Examiner* — Jeffrey D. Popham
(74) *Attorney, Agent, or Firm* — Womble Bond Dickinson (US) LLP (57) ABSTRACT

Systems and methods for increasing security in a computer system are provided. The system includes one or more logic circuits. The one or more logic circuits receive a plurality of independent first entropy values from a hardware source, apply at least some of the plurality of independent first entropy values to a function to generate a second entropy value, and seed a pseudorandom number generator with the second entropy value. The one or more logic circuits also generate a random number using the pseudorandom number generator seeded with the second entropy value and may produce a block of ciphertext or message authentication code using the random number, or otherwise use the generated numbers as secure random numbers in applications such as cryptographic protocols.

18 Claims, 3 Drawing Sheets

SYSTEMS AND METHODS IMPLEMENTING COUNTERMEASURES TO PHASE TRACKING ATTACKS ON RING OSCILLATOR BASED ENTROPY SOURCES

TECHNOLOGICAL FIELD

The present disclosure relates generally to providing security in a computer system, in particular, to providing security in a computer system using countermeasures to phase tracking attacks on ring oscillator based entropy sources.

BACKGROUND

True random numbers are widely used in information security. For example, true random numbers can be used as a seed for a pseudorandom number generator to generate cryptographic keys. Ring oscillators are usually used as entropy sources to generate true random numbers because the phase of their oscillation signals is affected by true random circuit noise. However, oscillation signals of ring oscillators may leak out of the circuit. Thus, an unauthorized third party may be able to detect the leaked oscillation signals, which are emanated from the circuit wirelessly or appear on the connectors or pins of the electronic circuits. If the unauthorized third party is able to perform phase tracking attacks successfully to reconstruct the phase drift of the ring oscillators from the leaked oscillation signals, the unauthorized third party may be able to recreate the true random numbers generated by the ring oscillators. Thus, when these true random numbers are used in information security, e.g., for generating cryptographic keys, the security is lost.

Existing solutions include using expensive metal shields around the circuits to protect against electromagnetic (EM) emanations from the ring oscillators. However, using expensive metal shields is usually ineffective. This is because the oscillation signals leak as EM radiation and are observable on pins or connectors of the electronic circuits implementing the ring oscillators or on power lines that feed the ring oscillators.

Therefore it would be desirable to have a system and method that take into account at least some of the issues discussed above, as well as other possible issues.

BRIEF SUMMARY

Example implementations of the present disclosure are directed to providing security in a computer system using countermeasures to phase tracking attacks on ring oscillator based entropy sources. In contrast to the existing solutions, example implementations provide protocol level solutions to obfuscate information in leaked oscillation signals, such that an unauthorized third party cannot easily use the information to recreate the true random numbers generated by one or more ring oscillators. These protocol level solutions are based on applying multiple entropy values generated by the one or more ring oscillators to a function. Thus, these protocol level solutions are inexpensive, effective, and easy to implement.

The present disclosure thus includes, without limitation, the following example implementations.

Some example implementations provide a method of providing security in a computer system, comprising: receiving a plurality of independent first entropy values from a hardware source; applying the plurality of independent first entropy values to a function to generate a second entropy value; seeding a pseudorandom number generator with the second entropy value; generating a random number using the pseudorandom number generator seeded with the second entropy value; and producing a block of ciphertext or message authentication code using the random number.

In some example implementations of the method of any preceding example implementation, or any combination of preceding example implementations, producing the block of ciphertext or message authentication code includes producing the block of ciphertext or message authentication code with a key composed of or derived from the random number.

In some example implementations of the method of any preceding example implementation, or any combination of preceding example implementations, producing the block of ciphertext or message authentication code includes at least: implementing a key-agreement protocol using the random number and in which a key is produced; and producing the block of ciphertext or message authentication code using the key.

In some example implementations of the method of any preceding example implementation, or any combination of preceding example implementations, the hardware source is a ring oscillator, and wherein receiving the plurality of independent first entropy values includes receiving the plurality of independent first entropy values from the ring oscillator.

In some example implementations of the method of any preceding example implementation, or any combination of preceding example implementations, the hardware source is a single hardware source, and the one or more logic circuits being configured to receive the plurality of independent first entropy values includes being configured to receive the plurality of independent first entropy values from the single hardware source.

In some example implementations of the method of any preceding example implementation, or any combination of preceding example implementations, the hardware source is a plurality of independent hardware sources, and wherein receiving the plurality of independent first entropy values includes receiving the plurality of independent first entropy values from the plurality of independent hardware sources.

In some example implementations of the method of any preceding example implementation, or any combination of preceding example implementations, the function is a permutation function, and the one or more logic circuits being configured to apply at least some of the plurality of independent first entropy values to the function includes being configured to apply at least some of the plurality of independent first entropy values to the permutation function.

In some example implementations of the method of any preceding example implementation, or any combination of preceding example implementations, applying at least some of the plurality of independent first entropy values to the function includes: dividing the plurality of independent first entropy values into multiple groups of independent first entropy values; applying the multiple groups of independent first entropy values to the permutation function to generate permuted groups of entropy values; and concatenating the permuted groups of entropy values to generate the second entropy value.

In some example implementations of the method of any preceding example implementation, or any combination of preceding example implementations, the function is a hash function, and wherein applying at least some of the plurality of independent first entropy values to the function includes applying at least some of the plurality of independent first entropy values to the hash function.

In some example implementations of the method of any preceding example implementation, or any combination of preceding example implementations, the function is a bit-mixer, and wherein applying at least some of the plurality of independent first entropy values to the function includes applying at least some of the plurality of independent first entropy values to the bit-mixer.

In some example implementations of the method of any preceding example implementation, or any combination of preceding example implementations, applying at least some of the plurality of independent first entropy values to the function includes selectively applying multiple entropy values of the plurality of independent first entropy values to the function to generate the second entropy value.

In some example implementations of the method of any preceding example implementation, or any combination of preceding example implementations, applying at least some of the plurality of independent first entropy values to the function includes applying at least some of the plurality of independent first entropy values and a secret key to the function to generate the second entropy value.

Some example implementations provide a system for providing security in a computer system, the system comprising one or more logic circuits configured to at least perform the method of any preceding example implementation, or any combination of preceding example implementations.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to providing security in a computer system, in particular, to providing security in a computer system using countermeasures to phase tracking attacks on ring oscillator based entropy sources.

Figure 1:
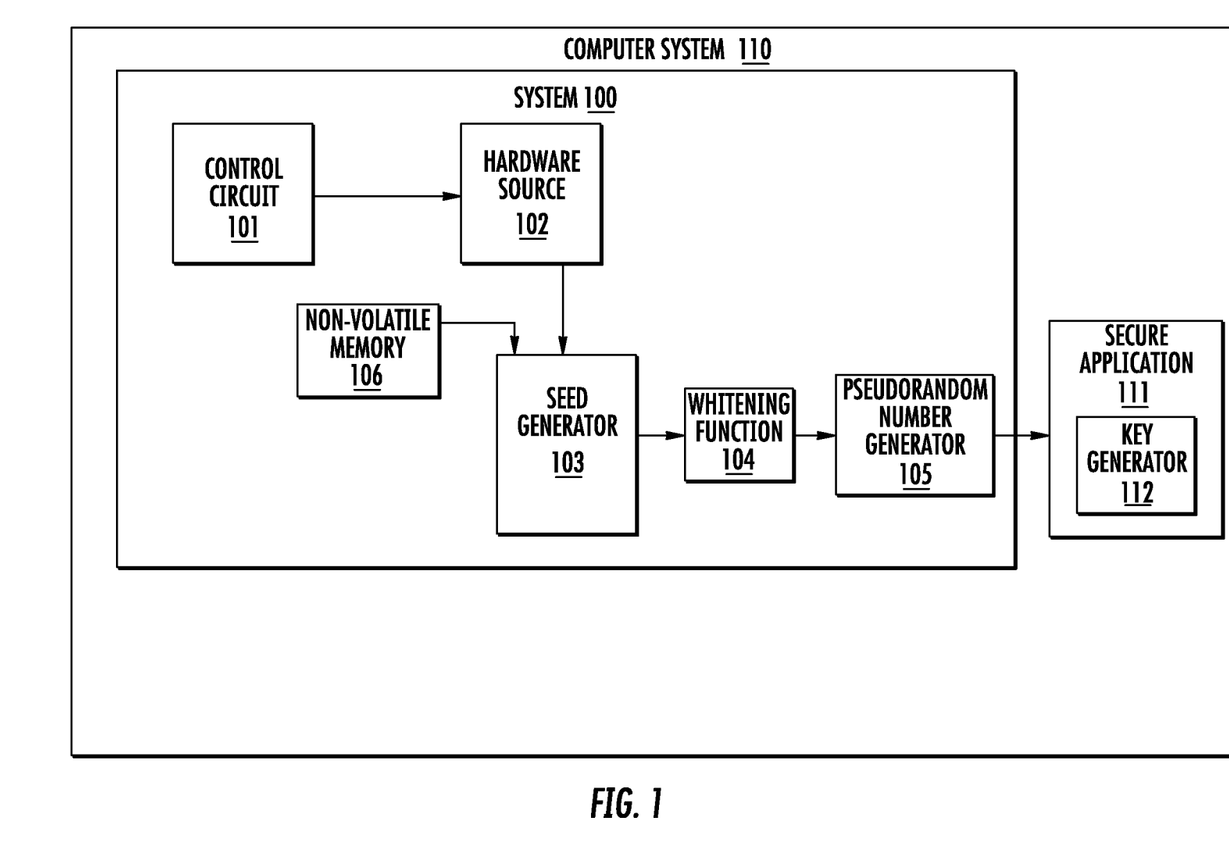
FIG. 1 illustrates a system for providing security in a computer system according to example implementations of the present disclosure.

FIG. 1 illustrates a system 100 for providing security in a computer system 110 according to example implementations of the present disclosure. The computer system 110 may include the system 100 as shown. For example, the computer system 110 may be equipped with the system 100. In another example, the computer system 110 and the system 100 may be two separate systems.

The system 100 may include one or more of each of a number of components, units or the like (generally "components") at least some of which may include or be implemented with logic circuits such as multiplexers, registers, arithmetic logic units, memory, microprocessors and the like. The system 100 may be designed for any of a number of different applications, and may have particular applicability to provide countermeasures to phase tracking attacks to the system 100 and provide security in the computer system 110.

The computer system 110 may include a processor and a computer-readable storage medium or memory coupled to the processor, where the processor is configured to execute computer-readable program code including one or more computer program stored in the memory. It will also be understood that one or more functions, and combinations of functions, may be implemented by special purpose electronic hardware-based systems and/or processors which perform the specified functions, or combinations of special purpose hardware and program code instructions. As shown, the computer program(s) stored memory and executable by the processor may include a secure application program 111 (also more simply referred to as a secure application).

In some examples, as shown, the system 100 includes a control circuit 101 configured to instruct or control a hardware source 102 to generate a plurality of independent first entropy values. The independent first entropy values may include true random numbers, e.g., a sequence of true random bits, generated by the hardware source. The hardware source can be attacked by phase tracking attacks. An unauthorized third party may be able to recreate the independent first entropy values via phase tracking attacks.

In some examples, the hardware source 102 is configured to provide the plurality of independent first entropy values to a seed generator 103. The seed generator is configured to receive the plurality of independent first entropy values and apply at least some of the plurality of independent first entropy values to a function to generate a second entropy value. The second entropy value is a secure value that cannot be easily attacked by phase tracking attacks. That is, it is hard or impossible for the unauthorized third party to recreate the second entropy value.

In some examples, the seed generator 103 is configured to provide the second entropy value to a whitening function 104 of the system 100. The whitening function can remove potential nonrandom properties of the second entropy value, such as bias or autocorrelation, and provide the second entropy value to a pseudorandom number generator 105. The pseudorandom number generator is configured to generate a random number (not a true random number but a pseudorandom number) using the seed (the second entropy value). Because the second entropy value is a secure value, the seed used by the pseudorandom number generator is secure. Thus, the random number generated by the pseudorandom number generator is also secure. That is, it is hard if not impossible for the unauthorized third party to recreate the random number generated by the pseudorandom number generator.

In some examples, the pseudorandom number generator 105 is configured to provide the random number to a key generator 112 of the secure application 111. The key generator is configured to produce a block of ciphertext or message authentication code using the random number. The key generator can provide the produced block of ciphertext or message authentication code to the secure application 111 of the computer system 110. Because the random number generated by the pseudorandom number generator is secure, the produced block of ciphertext or message authentication code is also secure. Thus, using the produced block of ciphertext or message authentication code in the secure application is also secure.

In some examples, the secure or cryptographic application 111 is configured to produce the block of ciphertext or message authentication code with a key composed of or derived from the random number. In some examples, the key generator 112 is configured to at least implement a key-agreement protocol using the random number and in which a key is produced, and produce the block of ciphertext or message authentication code using the key.

Figure 2:
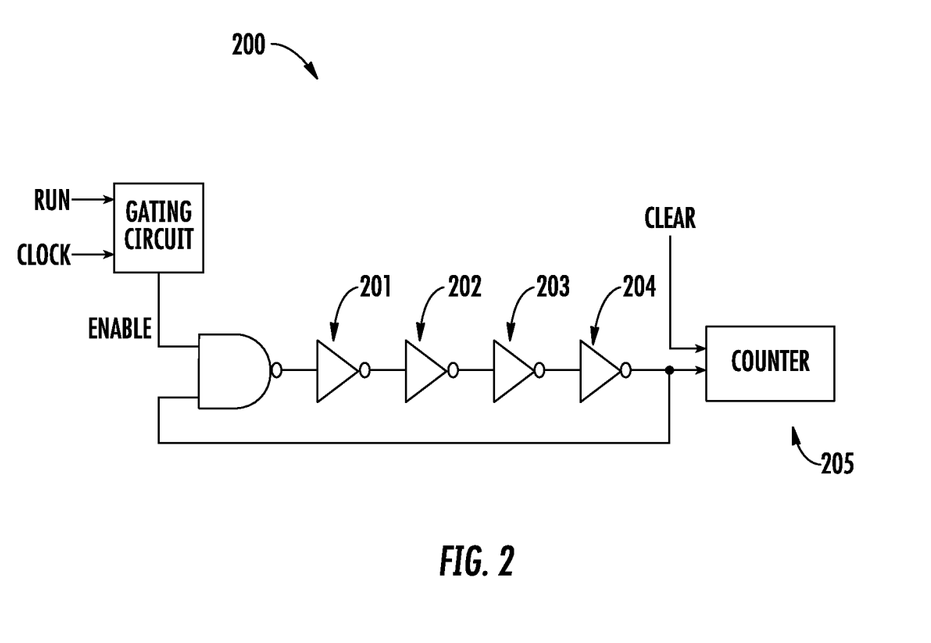
FIG. 2 illustrates a ring oscillator of the system, according to various example implementations.

In some examples, the hardware source 102 is a ring oscillator (as shown in FIG. 2 below). In these examples, the seed generator 103 is configured to receive the plurality of independent first entropy values from the ring oscillator.

In some examples, the hardware source 102 is a single hardware source, e.g., a single ring oscillator. In these examples, the seed generator 103 is configured to receive the plurality of independent first entropy values from the single hardware source. In some examples, the hardware source is a plurality of independent hardware sources, e.g., a plurality of ring oscillators. The seed generator is configured to receive the plurality of independent first entropy values from the plurality of independent hardware sources.

In some examples, the seed generator 103 includes a permutation function. The seed generator is configured to apply at least some of the plurality of independent first entropy values to the permutation function. In some examples, the seed generator is configured to divide the plurality of independent first entropy values into multiple groups of independent first entropy values, apply the multiple groups of independent first entropy values to the permutation function to generate permuted groups of entropy values, and concatenate the permuted groups of entropy values to generate the second entropy value.

In some examples, the seed generator 103 includes a hash function. The seed generator is configured to apply at least some of the plurality of independent first entropy values to the hash function to generate the second entropy value. In some examples, the seed generator includes a bit-mixer. The seed generator is configured to apply at least some of the plurality of independent first entropy values to the bit-mixer to generate the second entropy value.

In some examples, the seed generator 103 is configured to selectively apply multiple entropy values of the plurality of independent first entropy values to the function to generate the second entropy value. For example, the seed generator can select some but not all of the plurality of independent first entropy values to the function to generate the second entropy value according to a selection algorithm.

In some examples, the seed generator 103 is configured to apply at least some of the plurality of independent first entropy values and a secret key to the function to generate the second entropy value. For example, as shown, the seed generator may have two inputs. The first input is configured to receive the plurality of independent first entropy values from the hardware source 102. The second input is configured to receive the secret key from a non-volatile memory 106. The seed generator can apply data from the two inputs to generate the second entropy value. The seed generator can be a local building block of the system 100, such that a malfunction of the computer system 110 does not expose the secret.

In one example, the control logic 101 can be electronic control logic configured to start and stop the one or more ring oscillators in 102, when random numbers are requested. The ring oscillators drive counters to count the oscillation pulses while the ring oscillators are running. The seed generator 103 contains a plurality of functions that can be implemented in electronic logic circuits. The seed generator can hash, permute, select and/or combine the counter values according to a secret key stored in the protected storage 106. The storage may be nonvolatile memory, ROM or magnetic or optical disk drives. The resulting values are further processed in electronic logic circuits of the whitening function 104 to remove nonrandom properties, such as bias or autocorrelation. The process at the whitening function is often referred to as data conditioning or whitening. In another example, the whitening function can also be placed between 102 and 103. The pseudorandom number generator 105 contains a cryptographic pseudorandom number generator that can be electronic logic circuits or microprocessor functionality. The pseudorandom number generator is seeded by the obfuscated true random number from the whitening function. The pseudorandom number generator can also mix into its internal state to further obfuscate the true random numbers from the whitening function, whenever such values are available. Finally, the requestor of the random numbers is the secure application 111, which may use the random numbers in cryptographic key generation and/or security protocols.

FIG. 2 illustrates a ring oscillator 200 of the system 100, according to various example implementations. In some examples, the hardware source 102 in FIG. 1 includes one or more ring oscillators 200.

The ring oscillator 200 may include a plurality of logic gates, of which an odd number of logic gates invert their inputs connected to a previous logic gate connected in series, e.g., inverters 201-204 and the negative-AND (NAND) gate as shown in FIG. 2. The first of the plurality of inverters, e.g., the inverter 201, receives an input and generates an output (a logical negation of the input) as an input to the next inverter in the series, e.g., the inverter 202. An output of each except a last of the plurality of inverters is used as an input for a next one of the plurality of inverters. The output of the last of the plurality of inverters, e.g., the inverter 204, is fed back to and used as an input for the first of the plurality of inverters, e.g., the inverter 201.

The electronic circuit noise in the ring oscillator 200 randomly shifts the switching threshold of the inverters, which translates to phase "jitter" (random phase variations) of the oscillator signal. The phase jitter accumulates in time as phase drift, which largely and slowly shifts the phase of the oscillator signal, relative to the phase of a stable signal of the same frequency. Taking a sample of the oscillator signal or using a counter by counting the oscillation periods of the ring oscillator after a preset time period produces a true random number, e.g., a bit 0 or 1. The preset time period can be set by an independent clock signal.

In some examples, the output of the last of the plurality of inverters, e.g., the inverter 204, is sent to a counter 205 to generate the plurality of independent first entropy values by counting oscillation periods in a predefined time period. There are several ways to generate the plurality of independent first entropy values from the hardware source 102. In one example, the hardware source 102 includes a single ring oscillator, and the plurality of independent first entropy values can be generated by storing many (e.g., 20) counter values of the counter, after repeatedly starting and stopping the ring oscillator multiple times. In another example, instead of repeatedly starting and stopping the ring oscillator for reading the counter, the oscillation signal of the ring oscillator can be alternatingly redirected during predetermined time periods to one of two (dual or ping-pong) counters. At the redirection time points, many counter values (e.g., 20) can be stored as the plurality of independent first entropy values. In a third example, the hardware source 102 includes multiple ring oscillators (e.g., n=20), each with its own counter 205. The multiple ring oscillators can be of the same or different design. The plurality of independent first entropy values can be generated by implementing the multiple ring oscillators for a certain common time period, or implementing some of the multiple ring oscillators for different time periods, and saving their counter values.

One possible attack to the security of the random number generators based on ring oscillator 200 is tracking the instantaneous phase of the oscillation signal by utilizing information leakage on side channels. If sufficient amount of information about the frequency and phase of the oscillation signal leaks on side channels, an unauthorized third party can learn the phase drift of the ring oscillator and can recreate the plurality of independent first entropy values generated by the ring oscillator. If the pseudorandom number generator 105 uses the plurality of independent first entropy values as the seed, the unauthorized third party can recreate the random number generated by the pseudorandom number generator and know the produced block of ciphertext or message authentication code using the random number. In this situation, the computer system 110 using the produced block of ciphertext or message authentication code is not secure.

Example implementations of the present disclosure use the plurality of independent first entropy values in such a way that an unauthorized third party needs to discover not only one, but many entropy values involved, and possibly also a secret key that is used for mixing up the first entropy values. The disclosed implementations represent various ways to obfuscate the generated first entropy values, such that an unauthorized third party will not be able to determine the actual seed used in the pseudorandom number generator 105 from the leaked oscillator signals alone.

In some examples, the seed generator 103 includes a permutation function. A single counter value, which will be used as one of the first entropy values, is pseudo-randomly chosen from the available n counter values generated by a ring oscillator 200. The single counter value is pseudo-randomly selected by a cryptographic algorithm, dependent on a secret key from the non-volatile memory 106. The unauthorized third party will not know which counter value is actually used without the secret key for the pseudorandom selection. Several (e.g., k=15) such steps are implemented on the ring oscillator to provide a sequence of k independent counter values, e.g., a sequence of k bits. The sequence of k counter values is permuted by the seed generator to generate the second entropy value. The permuted sequence of k counter values (the second entropy value) is used as the seed. Even if the unauthorized third party learns every counter value of the k counter values via successful phase tracking attacks, the chance to guess the seed is only $1/n\hat{\ }k$. Practical values of n=20 and k=15 gives a chance of a successful attack≈$2^{-65}$, which is negligible. Larger values of n and k reduce this probability further.

Another example with higher throughput uses all n counter values, which are captured in n iterations of running a single ring oscillator 200 or in one iteration of running n ring oscillators (or a combination of the two, e.g., two iterations of running n/2 ring oscillators). Instead of randomly choosing single counter values of captured counter sets, we can use all n counter values, but in a pseudo-random order (computed with the secret key). In one example, n=20 counters can be arranged in 20!=2432902008176640000 permutations, which is about $2^{61}$. A phase tracking attack has to search through all n! permutations which is too time consuming and impractical.

A combination of the above methods can also be used. For example, the counters of n=8 ring oscillators are ordered pseudo-randomly, and 4 such sets of permuted counter values are concatenated as the seed (e.g., a 32-bit sequence). The number of possibilities is $(n!)^4 \approx 2^{61}$, which is too large for a practical attack to try.

Stream generators using a cryptographic algorithm can be used to pseudo-randomly select counter values generated by one or more ring oscillators 200. For example, stream generators may include block ciphers in counter mode by repeatedly encrypting a counter using a standard cipher such as Advanced Encryption Standard (AES) with a fixed secret key (stored in the storage 106) or in one of the standard feedback modes (e.g., by encrypting the previous ciphertext iteratively). Hash functions with a secret initial data block (a key stored in the storage 106) and constant message blocks can be called repeatedly to define cryptographic stream generators.

An exemplary pseudorandom selection algorithm can be described as follows. There are N items to select from ($A_1$, $A_2$ . . . , $A_N$), and b is the smallest number such that N≤$2^b$. From the stream S generated by a stream generator described above, the next unused b bits are taken, which form the number B. If B≤N, the selected entry is $A_B$, and b bits are discarded from S. If B>N, b bits are discarded from S, and retry, until B≤N is found. The pseudorandom selection algorithm can be implemented in a selector of the seed generator 103. Thus, using the selector, some but not all of the plurality of independent first entropy values can be applied to the permutation function to generate the second entropy value.

An exemplary pseudorandom permutation performed by the seed generator 103 to generate the second entropy value can be described as follows. Start with the elements in their natural order $A_1, A_2 \ldots, A_N$. For i=N . . . 2, swap the element currently in position i with a pseudo-randomly chosen element from positions 1 . . . i. The elements to be swapped can be chosen by the pseudorandom selection algorithm described above. The exemplary pseudorandom permutation is known as Knuth's shuffle.

In some examples, the seed generator 103 includes a hash function. Many (e.g. n=20) counter values are hashed together to a smaller size than their total length using the seed generator 103. Any single bit of entropy in the first entropy values generated by one or more ring oscillators, which the attacker did not guess correctly, makes the hash value uncorrelated to the correct hash value. The hashing process can be restarted for each seed, or the hashing operation can be continued from the state of the previous seed generation.

In another example, a secret key from the non-volatile memory 106 and many (e.g., n=20) counter values are hashed together to a smaller size than their total length. Any single input bit, which the attacker did not guess correctly, makes the hash value uncorrelated to the correct hash value. An attacker needs to find the entropy bits, and also needs to find the secret key stored in the non-volatile memory. The hashing process can be restarted for each seed with the same secret key, or the hashing operation can be continued from the state of the previous seed generation without repeating the key. The input to the seed generator 103 may also include the number of previous seed generation calls that further diversify the output (the second entropy value).

The seed generator 103 can perform a cryptographic hash function, which is a mathematical algorithm that maps data of arbitrary size to a bit string of a fixed size which is designed to also be a one-way function that is infeasible to invert. In some examples, the cryptographic hash function has four main properties: (1) it is quick to compute; (2) a small change to a message yields a hash value uncorrelated with the old hash value; (3) finding a message which hashes to a given value is infeasible (too slow); and (4) finding two different messages with the same hash value is infeasible.

In some examples, the seed generator 103 includes a bit-mixer. The bit-mixer may include hardcoded keys (the same in all systems or devices) or secret keys (different systems, devices or different sessions of operation use different secret keys). The bit-mixer is a function having five main properties. A first property is that the fixed lengths of the input and output can be independent and arbitrary. A second property is that every input bit affects every output bit. A third property is that simple changes in the input cause on average half of the output bits to change. A fourth property is that a series of simple changes in the input yield output values without apparent correlation to the input or to its change pattern. A fifth property is that parameters (keys) alter the behavior of the function. In one example, the bit-mixer is faster and smaller in electronics than the hash function, and the bit-mixer has negligible side channel leakage.

The above described implementations obfuscate the counter values and increase the complexity of the phase tracking attacks. That is, the attacker needs to perform phase tracking attack on multiple ring oscillators 200, and/or multiple times on the same ring oscillator. Also, the attacker has to find and extract a secret cryptographic key (stored in the storage 106) and/or the internal state of the hash/bit-mixer function (in the seed generator 103) which are used in the obfuscation. These data may be stored in protected erasable programmable read-only memory (EPROM) or other types of non-volatile data storage as a local building block of the security system 100, such that a malfunction of the computer system 110 does not expose the secret. If a secret key is not used, the attacker still has to try almost all of the huge number of possible selections and/or arrangement-mixings of the used counter values to be able to guess the actual seed (the second entropy value).

Figure 3:
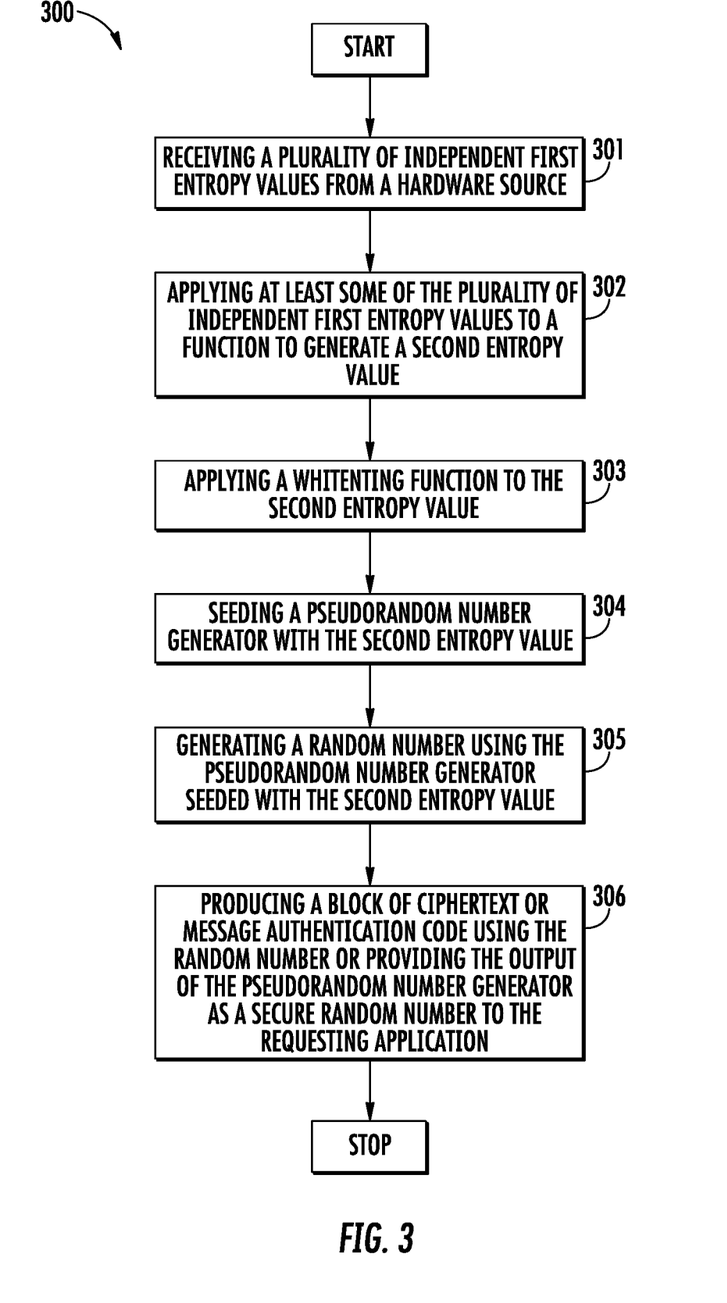
FIG. 3 is a flowchart illustrating various steps in a method of providing security in a computer system according to various example implementations.

FIG. 3 is a flowchart illustrating various steps in a method 300 of providing security in the computer system 110 according to various example implementations. At block 301, the method includes receiving a plurality of independent first entropy values from a hardware source 102. At block 302, the method includes applying at least some of the plurality of independent first entropy values to a function of a seed generator 103 to generate a second entropy value. At block 303, the method may include applying a whitening function 104 to the second entropy value. At block 304, the method includes seeding a pseudorandom number generator 105 with the second entropy value. At block 305, the method includes generating a random number using the pseudorandom number generator seeded with the second entropy value. At block 306, method includes producing a block of ciphertext or message authentication code using the random number. At block 306, the method may also include providing the output of the pseudorandom number generator as a secure random number to the requesting application. The secure random number may be used as a key for encryption, or for other secure purposes.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for providing security in a computer system, the system comprising one or more logic circuits configured to cause the system to at least:
   receive a plurality of independent, multi-bit first entropy values from at least one hardware source;
   apply at least some of the plurality of independent, multi-bit first entropy values to a function to generate a second entropy value, the function including a permutation function to permute the at least some of the independent, multi-bit first entropy values;
seed a pseudorandom number generator with the second entropy value;
generate a random number using the pseudorandom number generator seeded with the second entropy value; and
produce a block of ciphertext or message authentication code using the random number;
wherein the system caused to apply at least some of the plurality of independent, multi-bit first entropy values to the function includes the system caused to apply at least some of the plurality of independent, multi-bit first entropy values and a secret key to the function to generate the second entropy value.

2. The system of claim 1, wherein the system caused to produce the block of ciphertext or message authentication code includes the system caused to produce the block of ciphertext or message authentication code with a key composed of or derived from the random number.

3. The system of claim 1, wherein the system caused to produce the block of ciphertext or message authentication code includes the system caused to at least:
implement a key-agreement protocol using the random number and in which a key is produced; and
produce the block of ciphertext or message authentication code using the key.

4. The system of claim 1, wherein the at least one hardware source is a ring oscillator, and the system caused to receive the plurality of independent, multi-bit first entropy values includes the system caused to receive the plurality of independent, multi-bit first entropy values from the ring oscillator.

5. The system of claim 1, wherein the at least one hardware source is a single hardware source, and the system caused to receive the plurality of independent, multi-bit first entropy values includes the system caused to receive the plurality of independent, multi-bit first entropy values from the single hardware source.

6. The system of claim 1, wherein the at least one hardware source is a plurality of independent hardware sources, and the system caused to receive the plurality of independent, multi-bit first entropy values includes the system caused to receive the plurality of independent, multi-bit first entropy values from the plurality of independent hardware sources.

7. The system of claim 1, wherein the function further includes a hash function, and the system caused to apply at least some of the plurality of independent, multi-bit first entropy values to the function includes the system caused to apply at least some of the plurality of independent, multi-bit first entropy values to the hash function.

8. The system of claim 1, wherein the function further includes a bit-mixer, and the system caused to apply at least some of the plurality of independent, multi-bit first entropy values to the function includes the system caused to apply at least some of the plurality of independent, multi-bit first entropy values to the bit-mixer.

9. The system of claim 1, wherein the system caused to apply at least some of the plurality of independent, multi-bit first entropy values to the function includes the system caused to apply a select multiple but not all of the plurality of independent, multi-bit first entropy values to the function to generate the second entropy value.

10. A method of providing security in a computer system, comprising:
receiving a plurality of independent, multi-bit first entropy values from at least one hardware source;
applying at least some of the plurality of independent, multi-bit first entropy values to a function to generate a second entropy value, the function including a permutation function to permute the at least some of the independent, multi-bit first entropy values;
seeding a pseudorandom number generator with the second entropy value;
generating a random number using the pseudorandom number generator seeded with the second entropy value; and
producing a block of ciphertext or message authentication code using the random number;
wherein applying at least some of the plurality of independent, multi-bit first entropy values to the function includes applying at least some of the plurality of independent, multi-bit first entropy values and a secret key to the function to generate the second entropy value.

11. The method of claim 10, wherein producing the block of ciphertext or message authentication code includes producing the block of ciphertext or message authentication code with a key composed of or derived from the random number.

12. The method of claim 10, wherein producing the block of ciphertext or message authentication code includes at least:
implementing a key-agreement protocol using the random number and in which a key is produced; and
producing the block of ciphertext or message authentication code using the key.

13. The method of claim 10, wherein the at least one hardware source is a ring oscillator, and wherein receiving the plurality of independent, multi-bit first entropy values includes receiving the plurality of independent, multi-bit first entropy values from the ring oscillator.

14. The method of claim 10, wherein the at least one hardware source is a single hardware source, and wherein receiving the plurality of independent, multi-bit first entropy values includes receiving the plurality of independent, multi-bit first entropy values from the single hardware source.

15. The method of claim 10, wherein the at least one hardware source is a plurality of independent hardware sources, and wherein receiving the plurality of independent, multi-bit first entropy values includes receiving the plurality of independent, multi-bit first entropy values from the plurality of independent hardware sources.

16. The method of claim 10, wherein the function further includes a hash function, and wherein applying at least some of the plurality of independent, multi-bit first entropy values to the function includes applying at least some of the plurality of independent, multi-bit first entropy values to the hash function.

17. The method of claim 10, wherein the function further includes a bit-mixer, and wherein applying at least some of the plurality of independent, multi-bit first entropy values to the function includes applying at least some of the plurality of independent, multi-bit first entropy values to the bit-mixer.

18. The method of claim 10, wherein applying at least some of the plurality of independent, multi-bit first entropy values to the function includes applying a select multiple but not all of the plurality of independent, multi-bit first entropy values to the function to generate the second entropy value.

* * * * *